(12) United States Patent
Gerhardt et al.

(10) Patent No.: US 8,100,306 B2
(45) Date of Patent: Jan. 24, 2012

(54) ROOF BAR FOR A MOTOR VEHICLE

(75) Inventors: Torsten Gerhardt, London (GB); John K. Harding, Leigh-on-Sea (GB); Steve David Fleming, Hockley (GB); Danny Edward Stanesby, Benfleet (GB); Alicia Agius, Romford (GB); Will Farrelly, Chelmsford (GB); Ian Sutherland Wright, Chelmsford (GB)

(73) Assignee: Ford Global Technologies, Dearborn, MI (US)

( * ) Notice: Subject to any disclaimer, the term of this patent is extended or adjusted under 35 U.S.C. 154(b) by 378 days.

(21) Appl. No.: 12/403,633

(22) Filed: Mar. 13, 2009

(65) Prior Publication Data

US 2010/0230453 A1   Sep. 16, 2010

(51) Int. Cl.
   *B60R 9/47* (2006.01)

(52) U.S. Cl. ........ 224/320; 224/282; 224/309; 224/321; 224/539; 224/549

(58) Field of Classification Search ............ 224/282, 224/309, 311, 314, 320–321, 539, 549, 553; 296/37.5, 37.7; 211/85, 126.6, 132.1, 195, 211/41.5, 41.6; 248/447, 462, 460
   See application file for complete search history.

(56) References Cited

U.S. PATENT DOCUMENTS

| | | | |
|---|---|---|---|
| 2,516,088 A * | 7/1950 | Einhorn | 211/41.5 |
| 3,165,353 A * | 1/1965 | Weise | 296/210 |
| 3,891,262 A * | 6/1975 | Brunel | 296/3 |
| 5,303,858 A * | 4/1994 | Price | 224/405 |
| 5,431,472 A * | 7/1995 | Coffland | 296/3 |
| 5,527,146 A * | 6/1996 | Allsop et al. | 414/462 |
| 5,528,997 A * | 6/1996 | Miller | 108/131 |
| 6,079,936 A * | 6/2000 | Watters | 414/680 |
| 6,769,728 B2 * | 8/2004 | Albaisa et al. | 296/37.7 |
| 7,735,893 B2 * | 6/2010 | Brown et al. | 296/37.7 |
| 7,758,091 B1 * | 7/2010 | McCall | 296/3 |
| 7,798,381 B2 * | 9/2010 | Moreau et al. | 224/314 |
| 2006/0157524 A1 * | 7/2006 | Jung | 224/555 |
| 2007/0039985 A1 * | 2/2007 | Warren et al. | 224/321 |
| 2009/0159624 A1 * | 6/2009 | Johnson et al. | 224/316 |

FOREIGN PATENT DOCUMENTS

| | | | |
|---|---|---|---|
| DE | 3719974 A1 * | 12/1987 | |
| DE | 3826662 A1 * | 2/1990 | |
| DE | 4018009 A1 * | 12/1991 | |
| DE | 19954835 A1 * | 5/2001 | |
| EP | 2048033 A1 * | 4/2009 | |
| FR | 2862584 A1 * | 5/2005 | |

* cited by examiner

*Primary Examiner* — Justin Larson
*Assistant Examiner* — John Cogill
(74) *Attorney, Agent, or Firm* — Jerome R. Drouillard; Greg P. Brown

(57) ABSTRACT

A roof bar (10) for a motor vehicle (1) includes an elongate load carrying member (13) selectively held in a deployed position by a latch mechanism (20). A crossbar portion (15) of the elongate load carrying member (13) is wider than it is thick and is orientated such that the width of the crossbar portion (15) is vertically arranged when the roof bar (10) is in the deployed position so as to increase the resistance to vertical bending of the crossbar portion (15).

12 Claims, 14 Drawing Sheets

ROOF BAR FOR A MOTOR VEHICLE

CROSS REFERENCE TO RELATED APPLICATIONS

None.

BACKGROUND OF THE INVENTION

1. Field of the Invention

This invention relates to a motor vehicle, and in particular to a roof bar for carrying a load on a roof of the motor vehicle.

2. Related Art

It is known to provide a motor vehicle with two or more removable roof bars in order to carry objects on the roof of a motor vehicle such as, for example, a roof box, a ladder, scaffold poles, scaffold planks and long lengths of timber. It is a problem with a removable roof bar that considerable time and effort is required to fit or remove the roof bar from the vehicle.

It is a further problem that such fixed but removable roof bars greatly increase the height of the vehicle when they are fitted and, as such, removable roof bars are not ideal for use on a light commercial vehicle such as a van where it is desirable to keep the height of the vehicle below the height restrictions commonly imposed at car park entrances when no load is to be carried on the roof.

It would be an advantage to provide a stowable roof bar for a motor vehicle that is quick and easy to deploy or stow and does not significantly increase the overall height of the vehicle when it is stowed.

SUMMARY OF THE INVENTION

According to a first aspect of the invention there is provided a stowable roof bar for a motor vehicle comprising an elongate load carrying member extending across the vehicle and being pivotally connected to a roof of the vehicle for movement between stowed and deployed positions. A latch mechanism selectively holds the elongate load carrying member in the deployed position in which a crossbar portion of the elongate load carrying member is spaced above the roof of the vehicle. The width of the crossbar portion is greater than the thickness of the crossbar portion and the crossbar portion is re-orientated by the movement of the elongate load carrying member from the stowed position to the deployed position so as to increase the vertical resistance to bending of the crossbar portion. This has the advantage that a thin crossbar portion can be used to reduce the stowed height without compromising the resistance to bending of the crossbar portion when the roof bar is deployed.

The crossbar portion may be orientated such that the width of the crossbar portion is vertically arranged when the elongate load carrying portion is in the deployed position and the thickness of the crossbar portion is vertically arranged when the elongate load carrying portion is in the stowed position.

The thickness of the crossbar portion may be in the range of 15 to 20 mm.

The width of the crossbar portion may be in the range of 1.5 to 4.0 times the thickness of the crossbar portion.

The elongate load carrying member may comprise the crossbar portion and two end portions with one fastened to each end of the crossbar portion.

The elongate load carrying member may comprise the crossbar portion and two end portions, with one fastened to each end of the crossbar portion and with two stays, each of which is latchable to a respective one of the two end portions by a respective latch mechanism.

The two latch mechanisms may be linked together so that they work in unison so as to facilitate the releasing of the two latch mechanisms from one end of the roof bar.

This has the advantage that the roof bar can be stowed or deployed from one side of the motor vehicle.

Each of the stays may be connected to the corresponding end portion by a control link used to control the motion of the elongate load carrying member and the stay when the roof bar is reversibly moved between its deployed and stowed positions.

The control link may have a respective U-shaped end portion at each end. Each of the U-shaped end portions may have a first arm pivotally engaged with a respective end portion and a second arm pivotally connected to the respective stay on the same end of the roof bar.

When the latching means are released, each control link may form in combination with the respective end portion, the respective stay and a respective base plate, a four bar linkage.

The roof bar may further include a pair of base plates for fastening the roof bar to the roof of the vehicle, with each of the base plates having a respective stay pivotally connected to it near to one end and a respective end portion pivotally connected to it near to an opposite end.

Each of the end portions may be molded from a plastics material and may have a spigot extending therefrom. The crossbar is a tubular member having a bore shaped and sized to fit the spigots and the two end portions are fastened to the crossbar by means of the spigots.

Each end portion may have at least one large aperture formed therein for securing a load to the roof bar.

Each control link may have a detent forming part of a corresponding latch mechanism attached thereto and the control link may be transversely moveable so as to disengage the detent from an aperture in a wall of a corresponding stay so as to release the latch mechanism.

Each control link may be fastened at one end to a rod used to link the two latch mechanisms and is pivotally connected at an opposite end to one of the two stays, wherein a longitudinal displacement of the rod by a user of the vehicle is operable to simultaneously release both latch mechanisms and rotational movement of the rod facilitates folding of the roof bar.

The roof bar may be arranged to fold such that the end portions of the elongate load carrying member fold over onto the stays without increasing the stacked height of the stowed roof bar.

Each end portion may be U-shaped in cross-section and may define an internal volume in which a respective stay is stowed when the roof bar is in the stowed state.

The roof of the motor vehicle may have a high point and a low point and, when the roof bar is moved to its stowed state, no part of the stowed roof bar may be located higher than the high point of the roof so that the overall height of the motor vehicle is not increased by the stowed roof bar and no part of the roof bar may be located lower than the low point on the roof.

The roof bar may further comprise a pair of base plates to pivotally connect the elongate load carrying member to a roof of the motor vehicle, a pair of stays each pivotally connected to the roof of the vehicle by a respective one of the two base plates, the latch mechanism being arranged to selectively latch the stays to the elongate load carrying member so as to hold the elongate load carrying member in the deployed position wherein the thickness of the elongate load carrying member, the base plates and the stays are such that, when the latch mechanism is released so as to permit the roof bar to be moved to the stowed position in which the elongate load carrying member and the stays are folded flat on the roof of the vehicle, the highest point of the stowed roof bar is no higher than a high point on the roof of the motor vehicle so that the overall height of the vehicle is not increased and no part of the roof bar is located lower than a low point of the roof.

According to another aspect of the invention there is provided a motor vehicle having a roof and at least two roof bars constructed in accordance with said first aspect of the invention attached to the roof of the motor vehicle in a spaced apart relationship.

The roof of the motor vehicle has a high point and, when the roof bars fitted to the roof of the vehicle are moved to their respective stowed states, no part of the stowed roof bars may be located higher than the high point of the roof so that the overall height of the motor vehicle is not increased by the stowed roof bars and the roof has a low point corresponding to a height below which a surface is not self draining and no part of each roof bar may be stowed lower than the low point of the roof.

The roof may have a convex central portion bounded on each side by a longitudinally extending drainage ditch and the low point of the roof may correspond to the height of the drainage ditches and the central portion of the roof may have a number of open ended channels formed in it to accommodate the stowed roof bars, each of the channels having a base surface located no lower than the height of the drainage ditches so as to ensure that it is self draining and each roof bar is stowed in a respective one of the channels.

DETAILED DESCRIPTION OF THE PREFERRED EMBODIMENTS

FIGS. 1 to 4b show motor vehicle 1 as having roof 5 upon which is mounted two spaced apart identical stowable roof bars, 10.

Figure 1:
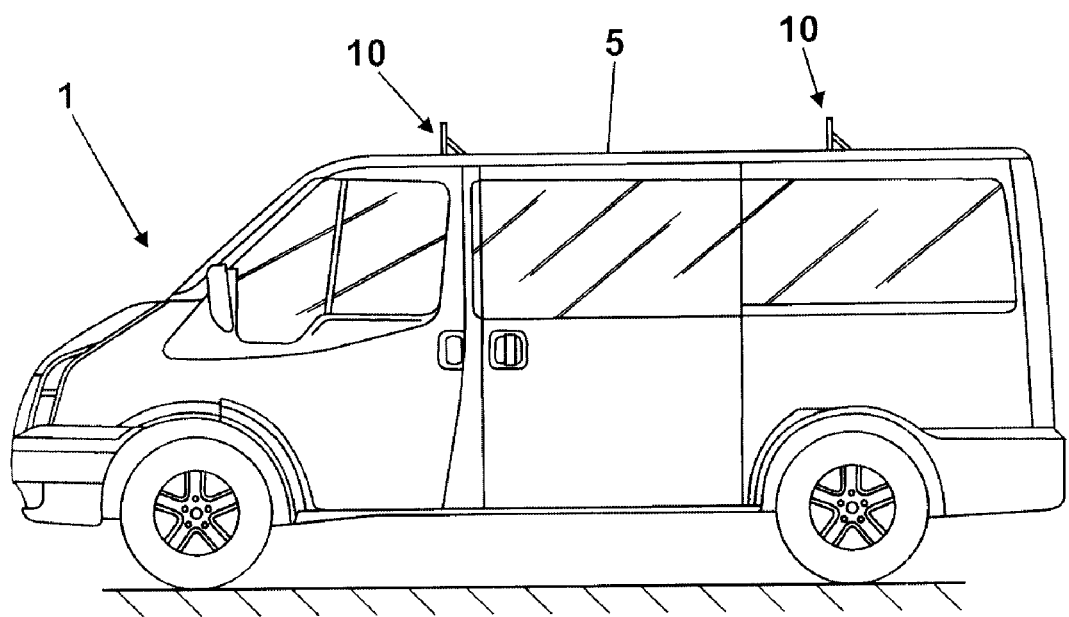
FIG. 1 is a side view of a motor vehicle according to an aspect of the present invention.
Figure 2:
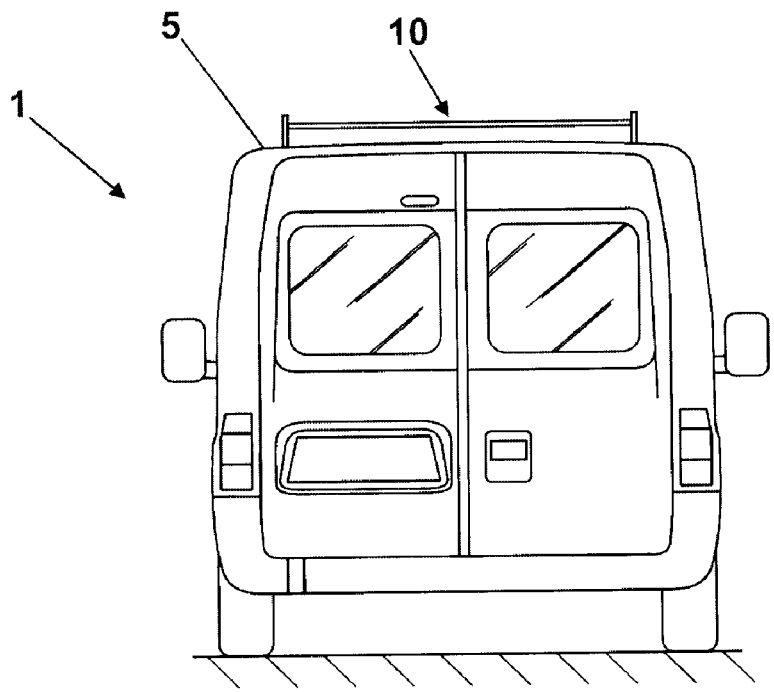
FIG. 2 is rear view of the motor vehicle shown in FIG. 1.
Figure 3A:
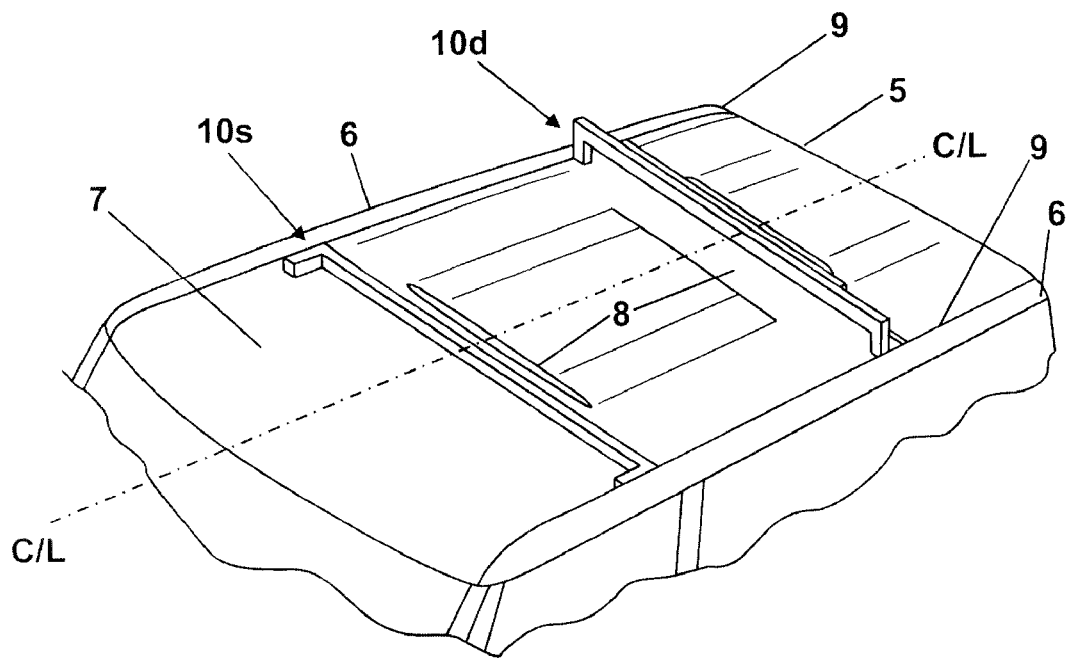
FIG. 3a is a pictorial schematic view of a roof of the vehicle shown in FIGS. 1 and 2, showing two transverse open ended channels and a roof bar according to the invention, in deployed and stowed states.
Figure 3B:
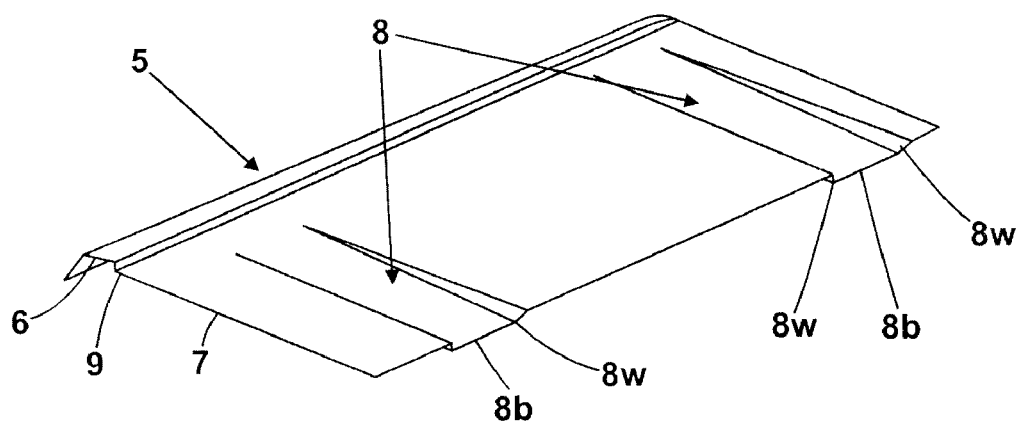
FIG. 3b is a pictorial view of the right hand side of the roof shown in FIG. 3 but with no roof bars in place.

Each of the roof bars 10 is reversibly moveable between a stowed state, indicated by the reference numeral 10s on FIG. 3a, to a deployed state, indicated by the reference numeral 10d on FIG. 3a, where it is retainable by a latch mechanism.

In FIGS. 1 to 3a the motor vehicle is in the form of a van 1 and is shown with two roof bars 10 fitted to its roof 5 but it will be appreciated that more than two roof bars 10 could be fitted to the roof 5.

Roof 5 comprises a convex central portion, 7, bounded on each longitudinal side by a drainage ditch, 9, two channels 8 each having sides surfaces 8w and a base surface 8b and a ridge 6 running longitudinally along both outer edges of the roof 5.

Figure 4A:
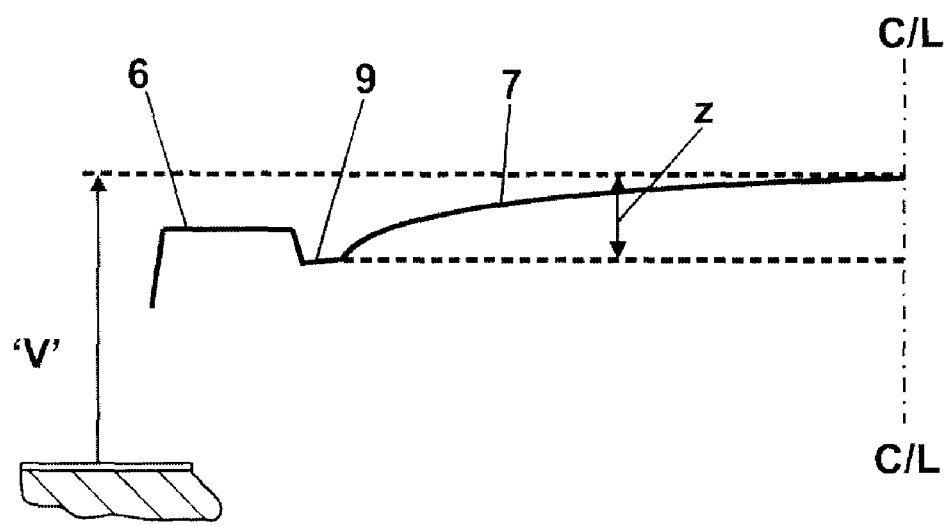
FIG. 4a is a partial transverse cross sectional view of the roof shown in FIG. 3b in which the dimensions and curvature have been greatly exaggerated.
Figure 4B:
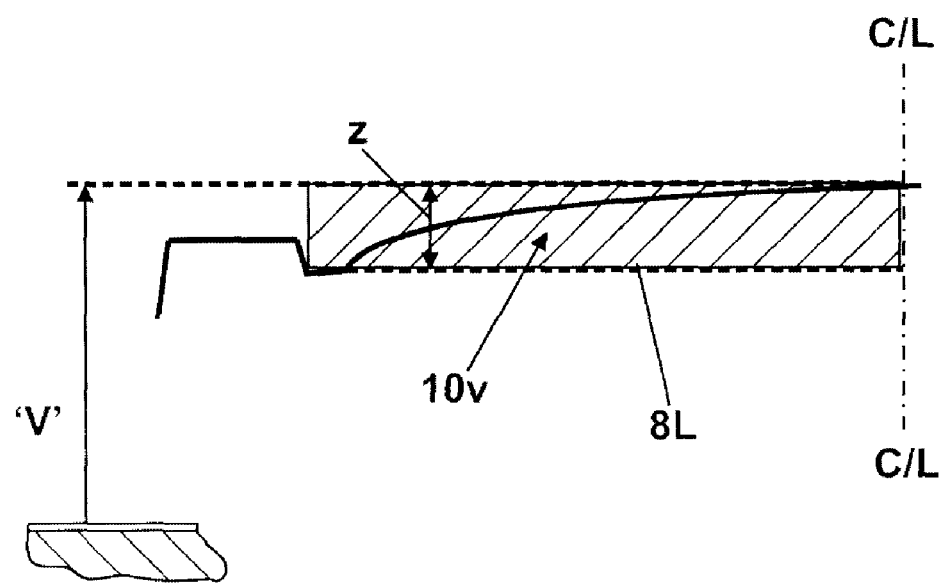
FIG. 4b is a view similar to that of FIG. 4a showing a possible stowage volume for a roof bar according to the invention.

Referring now to FIGS. 4a and 4b, the central roof portion 7 has a high point or crown located on the center line C/L of motor vehicle 1 and, in this case, this is also the highest point of the vehicle 1 and so defines the overall height 'V' of the vehicle 1. It will however be appreciated that with some roof forms the height of the ridges 6 may determine the overall height of the vehicle 1.

In the case where the high point is determined by the height of the ridges 6, there will be a difference in height between the high point of the central roof portion 7 and the highest point of the vehicle 1 and this difference in height may be sufficient in some case to package a stowed roof bar in accordance with this invention. However, in most cases, this difference will not be sufficient to permit a stowed roof bar to be stowed without increasing the vehicle height.

If, as shown, ridges 6 are lower than the overall height 'V' of the vehicle as determined by the high point of the central roof portion 7, a number of the channels 8 must be formed in the central roof portion 7 so as to provide sufficient volume in which to stow each roof bar 10 so that, when the roof bars 10 fitted to the roof of the vehicle 1 are moved to their respective stowed states, no part of the stowed roof bars 10 is located higher than the high point of the roof 5 so that the overall height 'V' of the vehicle 1 is not increased by the stowed roof bars 10. Such channels could also be used even if the high point is the ridges, to provide an increased volume for stowing roof bars 10.

roof 5 has a low point corresponding to a height below which a surface is not self draining and each roof bar 10 must be stowed on a surface that is no lower than the low point of the roof 5 so that the surface is self draining and to reduce drag, wind noise and improve the aesthetic appearance of the vehicle.

As the low point of roof 5 corresponds to the height of the drainage ditches 9, each of the channels 8 must have a base surface 8b located no lower than the height of the drainage ditches 9 so as to ensure that the channels 8 are self draining.

In FIGS. 4a and 4b the dimension z represents the vertical height between the level of the drainage ditches 9 and the high point of the roof 5 and it is this space that can be utilized by incorporating the channels 8 into the roof 5 to stow a roof bar 10. FIG. 4b shows as a shaded area 10v the volume that can be occupied by a stowed roof bar 10 without increasing the overall height 'V' of the vehicle 1. The line 8L corresponds to the minimum height of the base surface 8b that must be maintained if the corresponding channel 8 is to be self draining.

Therefore, although a roof bar formed in accordance with this invention can be used on many types of roof depending upon their respective configuration and is not limited to a roof having the profile shown, it is desirable for the roof 5 to have a number of open ended channels 8 because these can be used to assist with stowage of the roof bars 10 by providing an additional stowage volume.

With reference to FIGS. 5 to 9 there is shown a first embodiment of a roof bar according to the invention.

Roof bar 10 includes an elongate load carrying member, 13, pivotally connected to roof 5 of vehicle 1 so as to extend across vehicle 1. Two stays, 14, pivotally connect to roof 5 and a latch mechanism, 20, selectively latches each stay 14 to the elongate load carrying member 13 so as to hold elongate load carrying member 13 in a deployed state in which a crossbar portion 15 of the elongate load carrying member 13 is spaced above the roof 5 of the vehicle 1.

Elongate load carrying member 13 is H-shaped and includes crossbar portion 15 and two end portions 16, one fastened to each end of the crossbar portion 15.

End portions 16 are used to space the crossbar 15 above the roof 5 when the roof bar 10 is in the deployed state and provide end stops for the crossbar 15 so as to prevent an item secured to the roof bar 10 from sliding off either end of the crossbar 15.

Cross-bar 15 is formed in this case from a rectangular tube that is wide relative to its thickness so that, when the crossbar portion 15 is in the deployed state, the crossbar 15 is able to support a load fastened to the roof bar 10 but, when the roof bar 10 is stowed, the thickness of the crossbar 15 is such that the overall height of the vehicle 1 is not increased by the stowed roof bar 10.

Figure 15A:
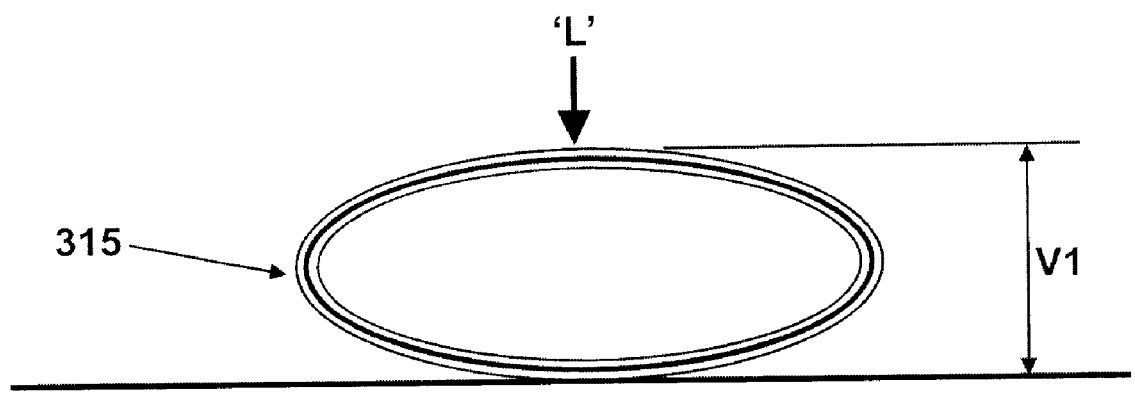
FIG. 15a is a partial cross-section through a crossbar portion of the roof bar showing the orientation of the crossbar portion when the roof bar is in the stowed position.
Figure 15B:
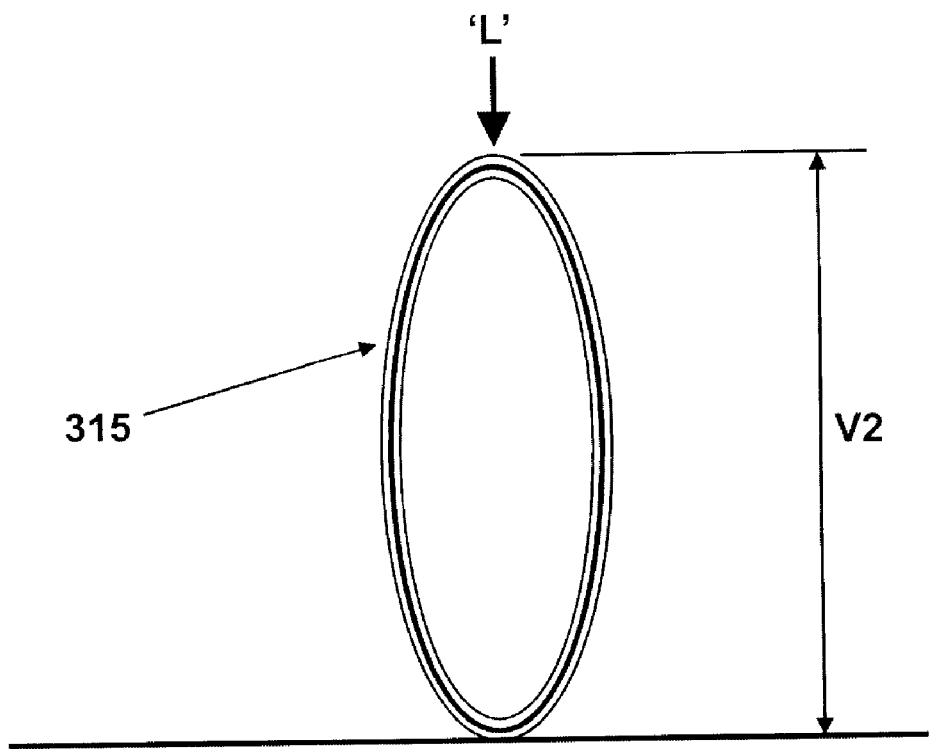
FIG. 15b is a partial cross-section of the crossbar portion shown in FIG. 15a showing the orientation of the crossbar portion when the roof bar is deployed.

The asymmetric shape of the cross bar portion 15 in combination with the fact that the crossbar portion 15 is re-orientated when the elongate load carrying member is moved between the stowed and deployed positions is a significant feature of this invention. FIGS. 15a and 15b show a cross section through a crossbar portion that is asymmetric, being in this case oval. That is to say the width 'V2' of the crossbar portion is significantly greater than the thickness 'V1' and the width 'V2' may be in the order of 1.5 to 4 times the thickness 'V1'. FIGS. 15a and 15b show the effect of the re-orientation of the crossbar portion due to the movement of the elongate load carrying member 13 from the stowed position indicated in FIG. 15a and deployed position indicated in FIG. 15b. It will be appreciated that when the elongate load carrying member 13 is in the stowed position the crossbar portion has a low resistance to bending if a vertical load 'L' is applied, due to its relatively low second moment of area, but is vertically thin (circa 15 to 20 mm) and so will have very little impact on the height of the motor vehicle 1. Whereas when the elongate load carrying member 13 is in the deployed position the crossbar portion has a high resistance to bending if the vertical load 'L' is applied. This is due to the fact that the second moment of area is increased in relation to a vertical load when the crossbar portion is re-orientated by the movement of the elongate load carrying member 13 to the deployed position.

Crossbar portion 15 is orientated such that the width 'w' of the crossbar portion 15 is vertically arranged when the elongate load carrying portion 13 is in the deployed position and the thickness 't' of crossbar portion 15 is vertically arranged when the elongate load carrying portion 13 is in the stowed position.

It will be appreciated that other shapes could be used for the crossbar portion and that the crossbar portion need not be rectangular or oval in cross-section. What is required is a crossbar portion that is thin in one direction so as to have minimal impact on vehicle height when the elongate load carrying member is stowed and wide in another direction so as to have a relatively high second moment of area when the wide dimension is arranged in the deployed position.

Each of the end portions 16 is formed from a U-shaped channel member. The end portions 16 are fastened at opposite ends of the crossbar 15 so as to form the H-shaped elongate load carrying member 13.

The roof bar 10 further comprises a pair of base plates 11 which are used to fasten the roof bar 10 to the roof 5 of the vehicle 1. Each of the base plates 11 has one of the two stays 14 pivotally connected to it near to one end and a corresponding end portion 16 pivotally connected to it near to an opposite end.

The width and thickness of the end portions 16 is such that they can be folded down so as to overlie the corresponding stay 14 and base plate 11 when the roof bar 10 is moved to the stowed position. That is to say, the end portions 16 define an internal volume in which the stays 14 are at least partially contained when the roof bar 10 is in the stowed state.

The height of the stowed roof bar 10 is therefore determined by the largest of the thickness of the end portions 16 of the roof bar 10 and the thickness of the crossbar portion 15. In most cases this dimension can be made as small as 15 to 20 mm without sacrificing the mechanical integrity of the roof bar 10.

Figure 5:
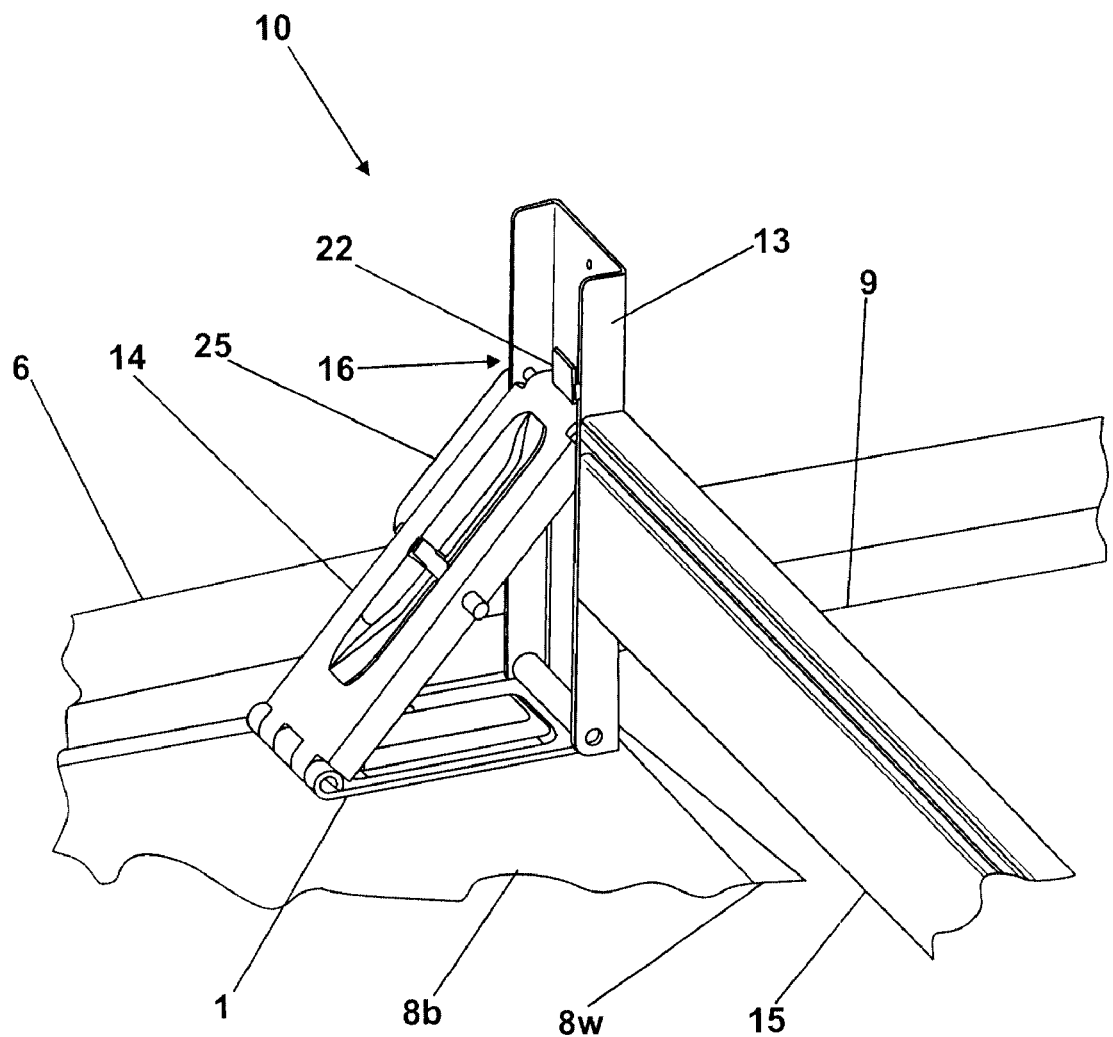
FIG. 5 is a pictorial view of a right hand end portion of the roof bar shown schematically on FIG. 3a in the deployed state.
Figure 6:
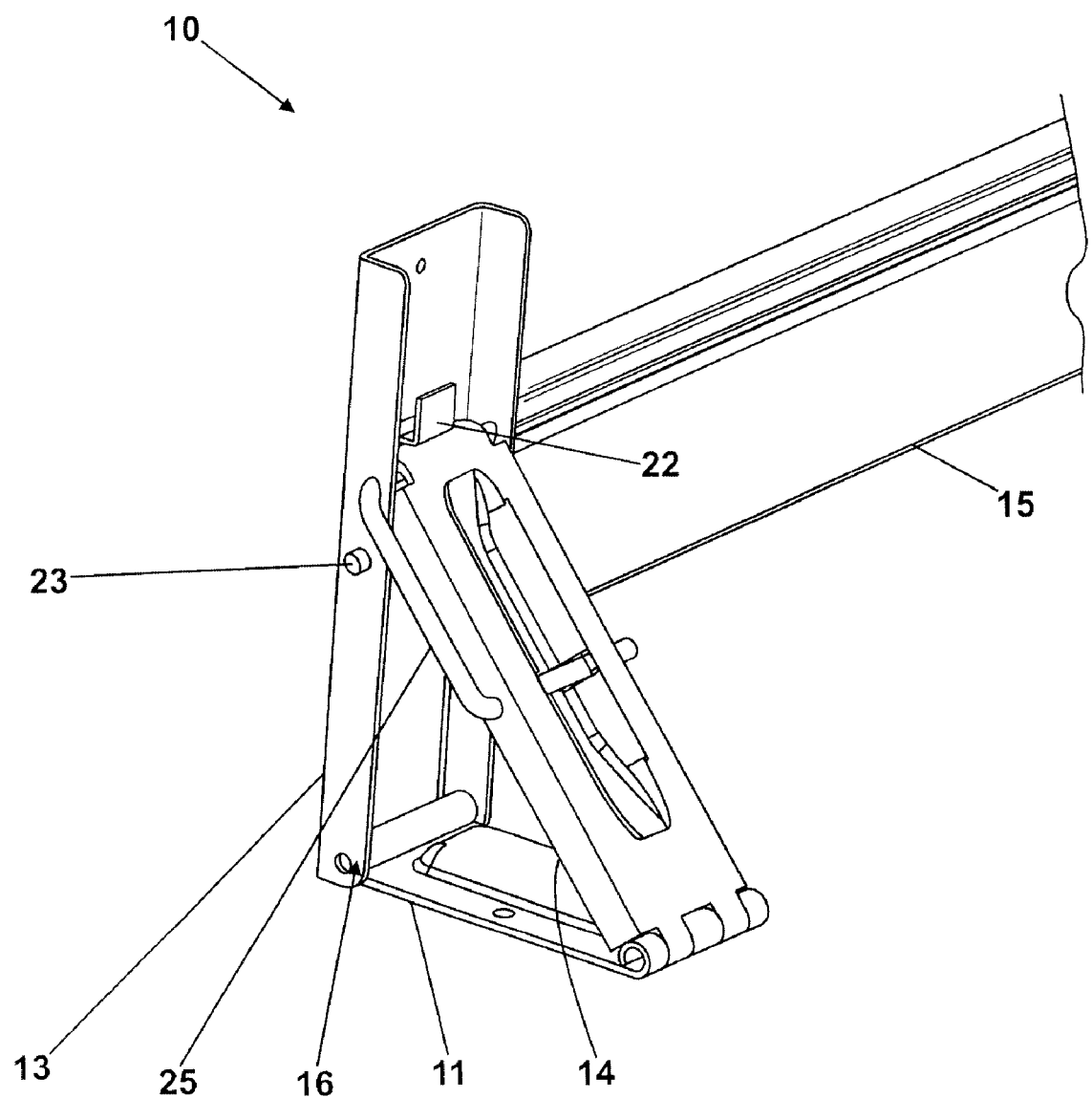
FIG. 6 is a reversed pictorial view of the roof bar shown in FIG. 5.
Figure 7:
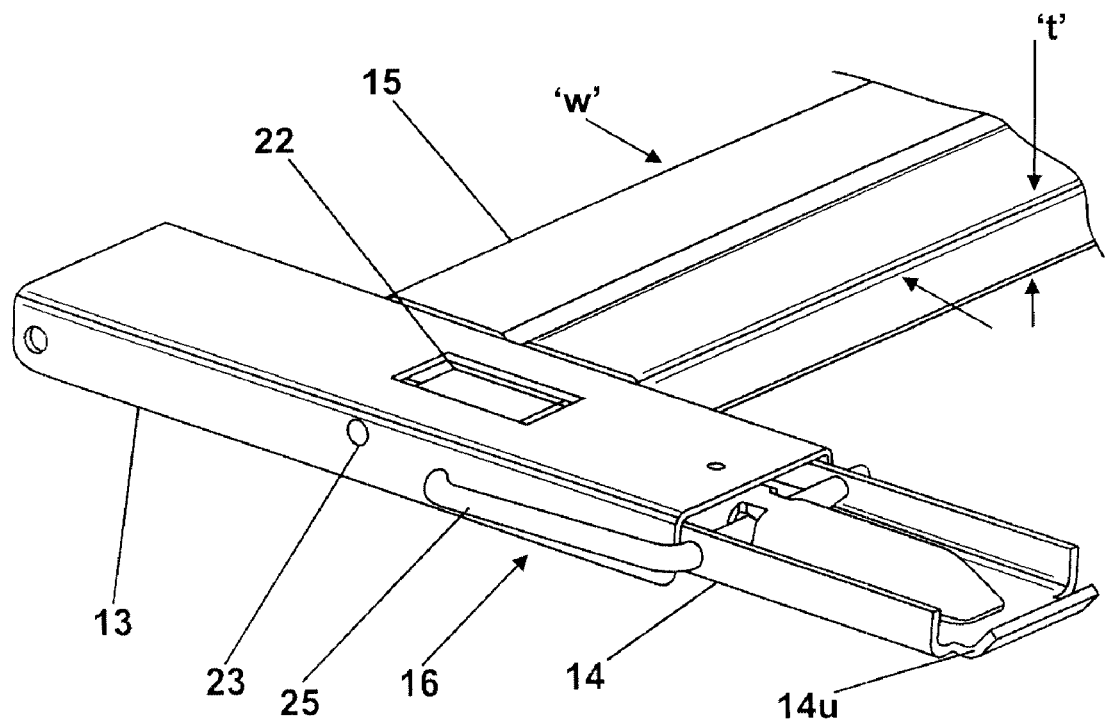
FIG. 7 is a pictorial view similar to that of FIG. 6 but showing the roof bar in a stowed state.

As shown in FIG. 5, base plates 11 are secured in drainage ditches 9 of roof 5 and, when stowed, crossbar 15 rests upon the lower surface 8b of one of channels 8. However, it will be appreciated that roof bar 10 could be fastened to roof 5 so that it lies entirely within one of channels 8, or if there are no channels, directly to any convenient location on roof 5.

Figure 8:
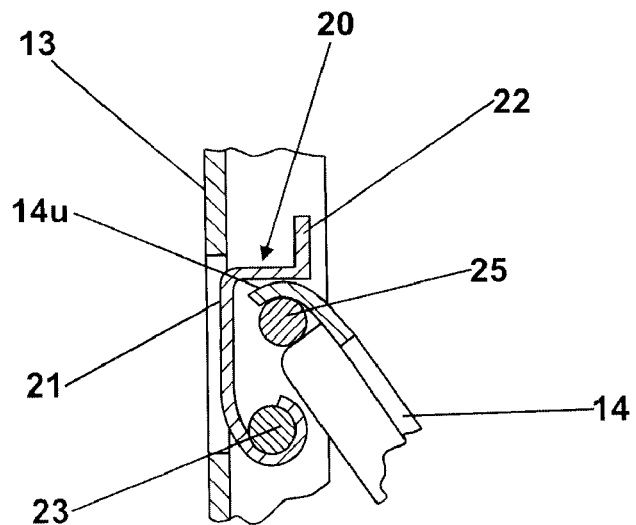
FIG. 8 is a partial cross-section through a latch mechanism used to hold the roof bar in the deployed state.
Figure 9:
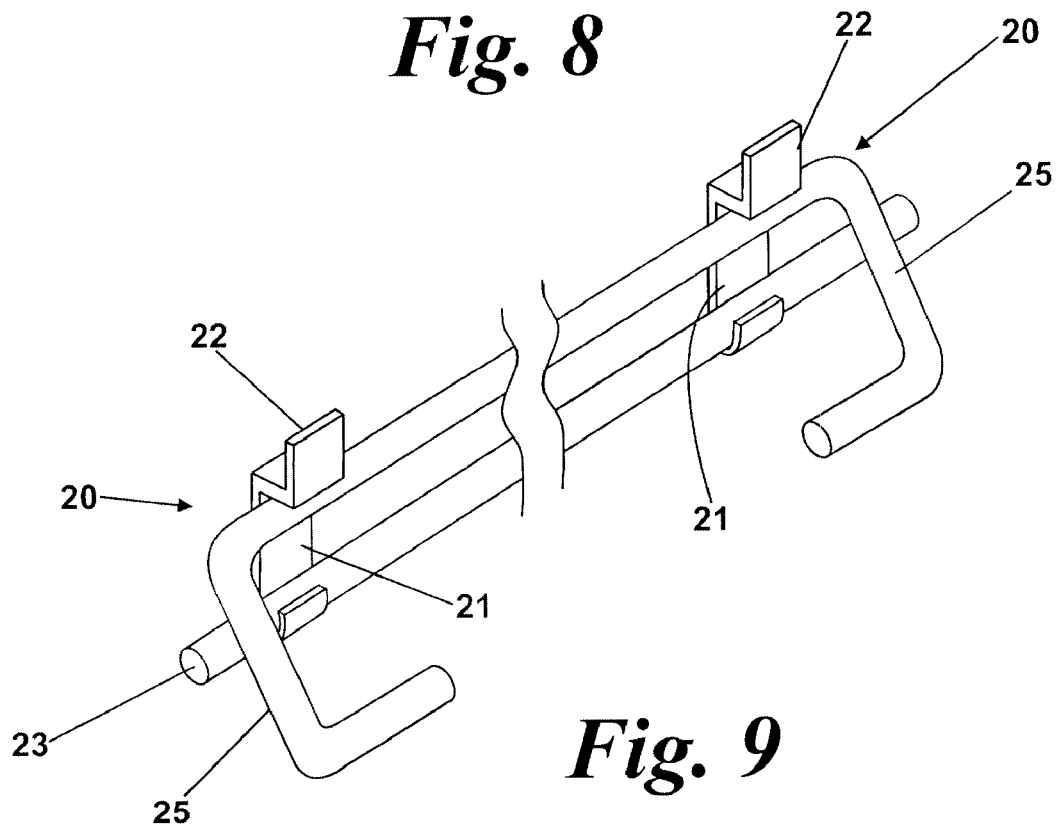
FIG. 9 is a pictorial schematic view showing the interlinking of two latch mechanisms and the location of a control link used to control the folding motion of the roof bar as it would appear if removed from the roof bar.
Figure 10:
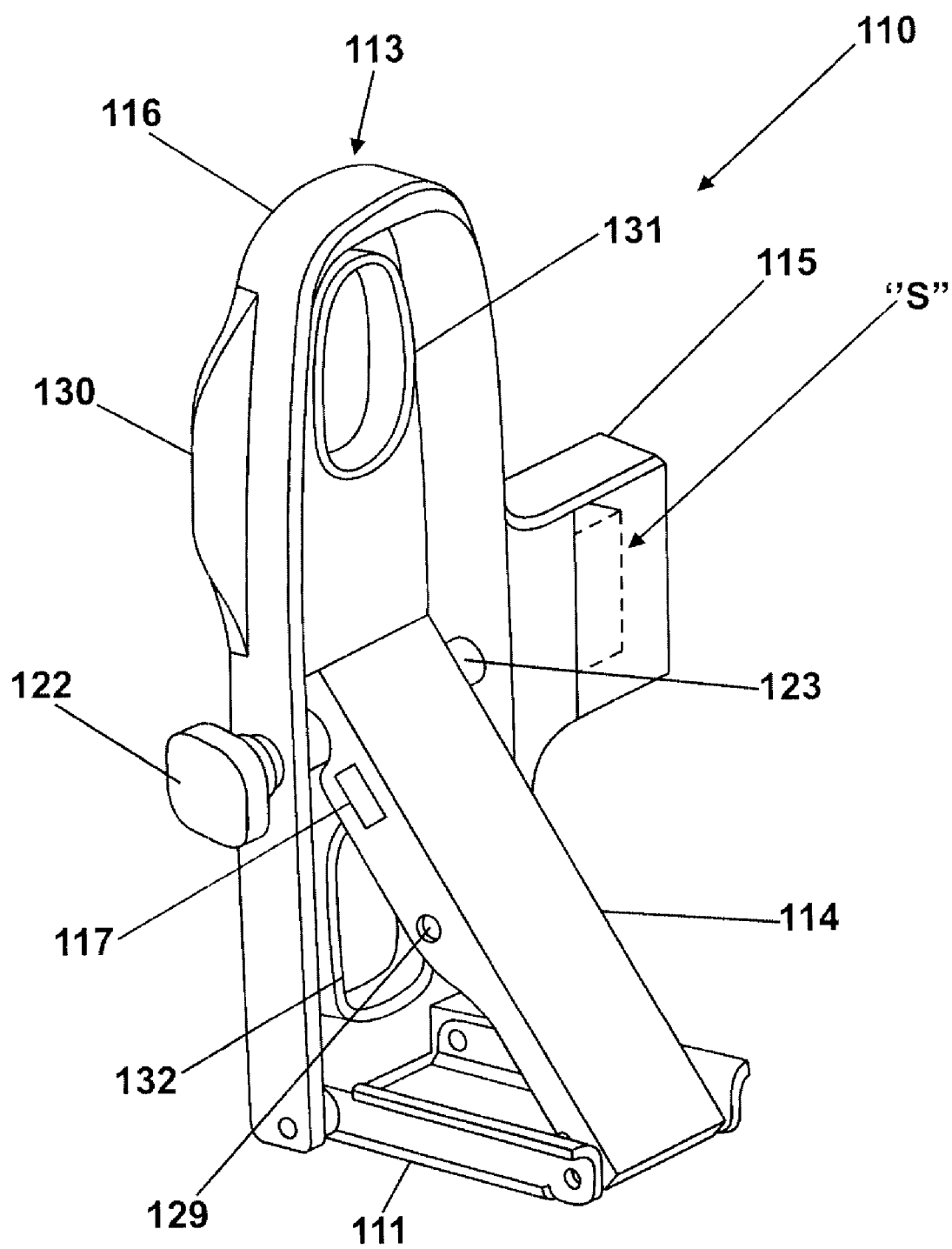
FIG. 10 is a pictorial view similar to that of FIG. 6 but showing a second embodiment of roof bar according to the invention.
Figure 11:
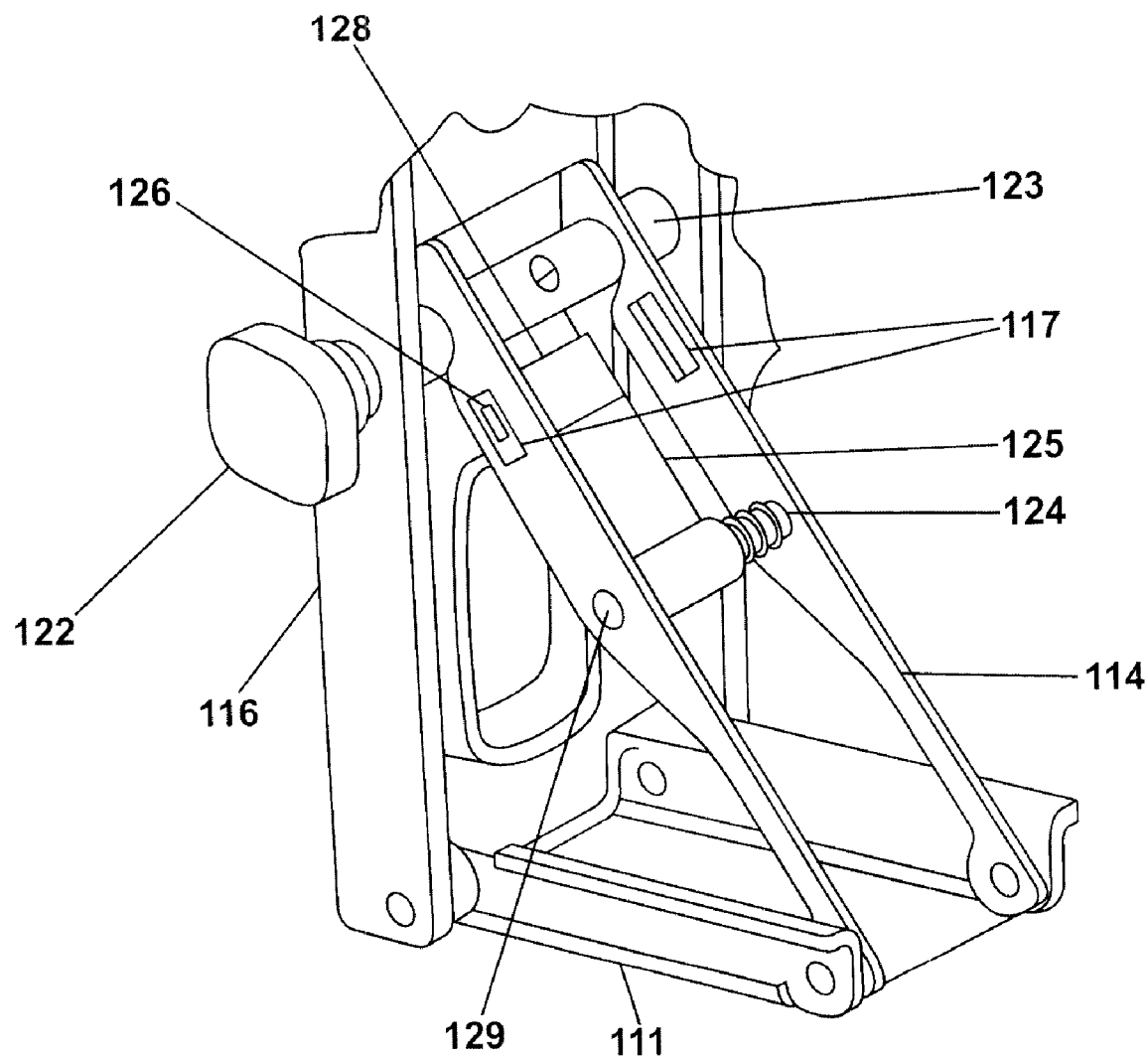
FIG. 11 is a pictorial view similar to that of FIG. 10, with a stay member cut away to show a latch mechanism when the roof bar is in the deployed state.
Figure 12:
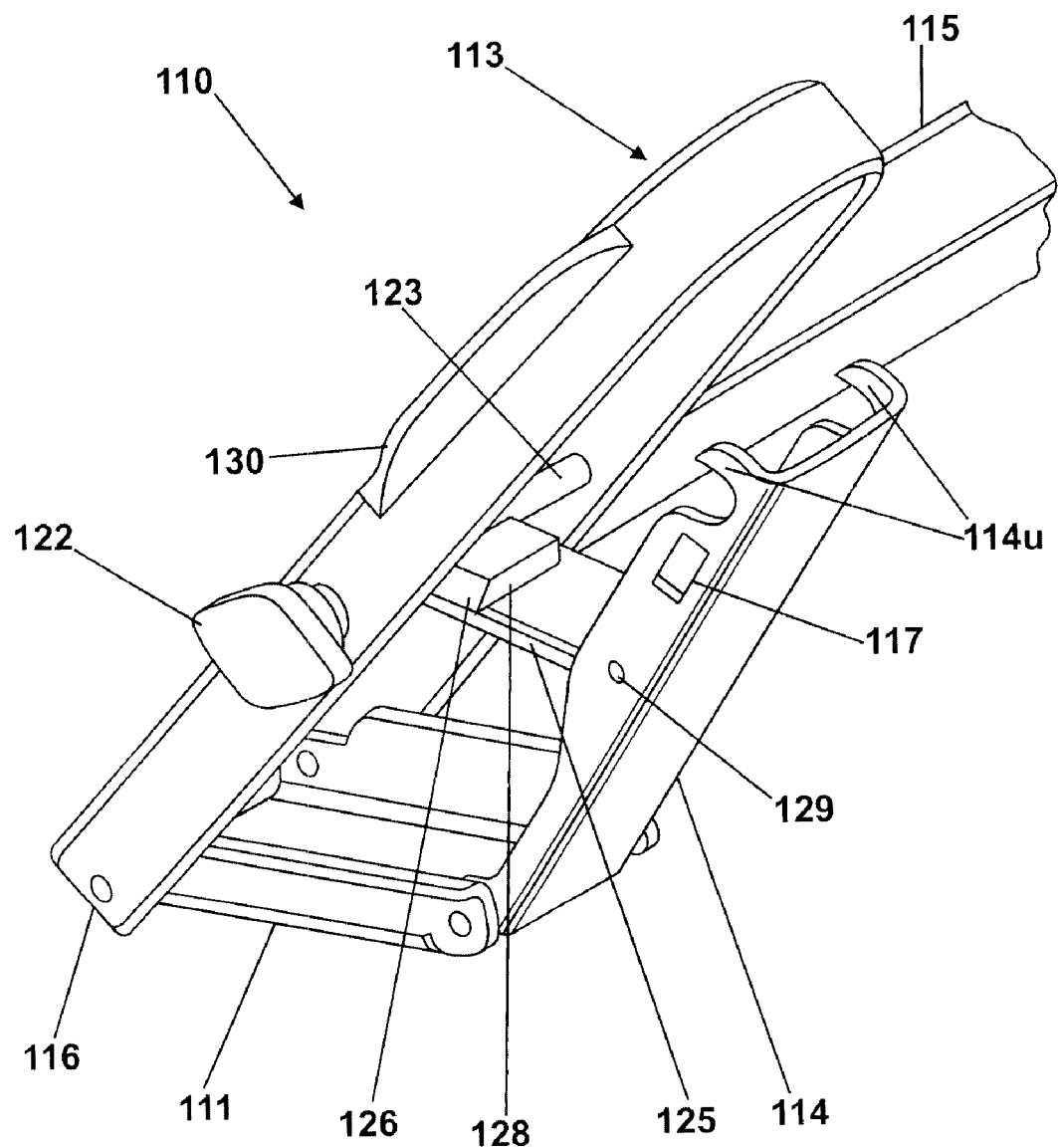
FIG. 12 is a view similar to that of FIG. 10, but showing the arrangement of components when the roof bar is partially stowed.

Each of the two stays 14 is latchable to a respective one of the two end portions 16 by a respective latch mechanism 20. As best seen in FIGS. 8 and 9 each latch mechanism includes a latch arm, 21, fastened at one end to a rod, 23, that extends across roof bar 10 so as to link together the two latch mechanisms 20. Latch arm 21 has a stepped end, 22, which, when the latch mechanism 20 is engaged, overlies a turned over end portion, 14u, of the corresponding stay 14 so as to trap the stay 14 between the latch arm 21 and a control rod 25 pivotally connected to the stay 14. If the stepped end 22 is pressed by a user of the vehicle 1, latch arm 21 will rotate rod 23 and move away from turned over end 14u of stay 14, thereby releasing stay 14 and allowing roof bar 10 to be folded from the deployed state to the stowed state. Rod 23 will also release latch mechanism 20 on the other end of roof bar 10, and so rod 23 ensures that the two latch mechanisms 20 work in unison and can be operated from either side of the vehicle 1. It is an advantage of the invention that the latch mechanism 20 holding the stays 14 can be released from one end of the roof bar 10 as this provides increased ease of use and eliminates the need for two operatives to deploy or stow the roof bar 10.

Each of the stays 14 is connected to the corresponding end portion 16 by control rod 25, which is pivotally connected at one end to a respective end portion 16 and is pivotally connected at an opposite end to the respective stay 14 on the same end of the roof bar 10 and is U-shaped at each end. The U-shaped end portions each have a first arm pivotally engaged with a respective end portion 16, and a second arm pivotally connected to the respective stay 14 on the same end of the roof bar 10.

When latching means 20 is released, control rod 25 forms in combination with the respective end portions 16, stays 14 and base plates 11 a four bar linkage which is used to control the motion of the elongate load carrying member 13 and stays 14 when roof bar 10 is reversibly moved between its deployed and stowed positions.

In operation, roof bar 10 can be moved from its deployed position, in which an upper surface of the cross bar 15 is positioned approximately 100 to 200 mm above the adjacent central roof portion 7, to the stowed state, in which it is folded flat on the roof 5, by simply releasing one of the latch mechanisms 20 and pushing or pulling the elongate load carrying member 13 to its stowed position. To reverse the procedure the elongate load carrying member 13 is merely lifted from its stowed position until the latch mechanisms 20 are re-engaged.

With reference to FIGS. 10 to 14c there is shown a second preferred embodiment of roof bar 110 according to the invention which is intended to be a direct replacement for the roof bar 10 previously described.

The roof bar 110 comprises an elongate load carrying member, 113, pivotally connected to roof 5 so as to extend across the vehicle 1. Two stays, 114, are pivotally connected to roof 5 of the vehicle. A latch mechanism selectively latches each stay 114 to the elongate load carrying member 113 so as to hold the elongate load carrying member 113 in a deployed state in which a crossbar portion 115 of the elongate load carrying member 113 is spaced above the roof 5 of the vehicle.

Elongate load carrying member 113 is H-shaped and comprises crossbar portion 115 and two end portions 116, with one fastened to each end of the crossbar portion 115.

End portions 116 are used to space crossbar 115 above roof 5 when roof bar 110 is in the deployed state and provide end stops for crossbar 115 so as to prevent an item secured to roof bar 110 from sliding off either end of crossbar 115.

Crossbar 115 is formed from a rectangular extruded aluminium tube that is wide relative to its thickness so that, when crossbar 115 is in the deployed state, crossbar 115 is able to support a load fastened to roof bar 10 but, when roof bar 110 is stowed, the thickness of crossbar 115 is such that the overall height of vehicle 1 is not significantly increased by stowed roof bar 110.

As before, the crossbar portion is asymmetric in shape having a width 'w' that is significantly greater than its thickness 't'. The width 'w' may for example be in the range of 1.5 to 4.0 times greater that the thickness 't'. The thickness may be in the range of 15 to 20 mm. As before, the crossbar portion 115 is re-orientated by the movement of the elongate load carrying member 113 from the stowed to the deployed position so as to provide an increased resistance to vertically applied bending loads.

Crossbar portion 115 is orientated such that the width 'w' of the crossbar portion 115 is vertically arranged when the elongate load carrying portion 113 is in the deployed position and the thickness 't' of crossbar portion 115 is vertically arranged when the elongate load carrying portion 113 is in the stowed position.

Each of the end portions 116 is formed from a U-shaped channel member that is closed at one end to increase its strength. The end portions 116 are fastened at opposite ends of the crossbar 115 so as to form the H-shaped elongate load carrying member 113.

Each of the end portions 116 is molded from a plastic material and has a spigot "S" (shown as a broken line only on FIG. 10) extending therefrom. The crossbar 115 has a bore shaped and sized to fit the spigots "S" and the two end portions 116 are fastened to the crossbar 115 by means of the spigots "S" by, in this case, adhesive bonding.

Each end portion 116 also has a grip handle 130 formed as an integral part to assist with moving the roof bar 110 between its deployed and stowed states and two large apertures 131, 132 formed therein for securing a load to the roof bar 110 when the roof bar 110 is in use.

Roof bar 110 further includes of a pair of base plates, 111, which are used to fasten roof bar 110 to roof 5 of vehicle 1. Each of base plates 111 has one of the two stays 114 pivotally connected to it near to one end and a corresponding end portion 116 pivotally connected to it near to an opposite end.

Figure 13:
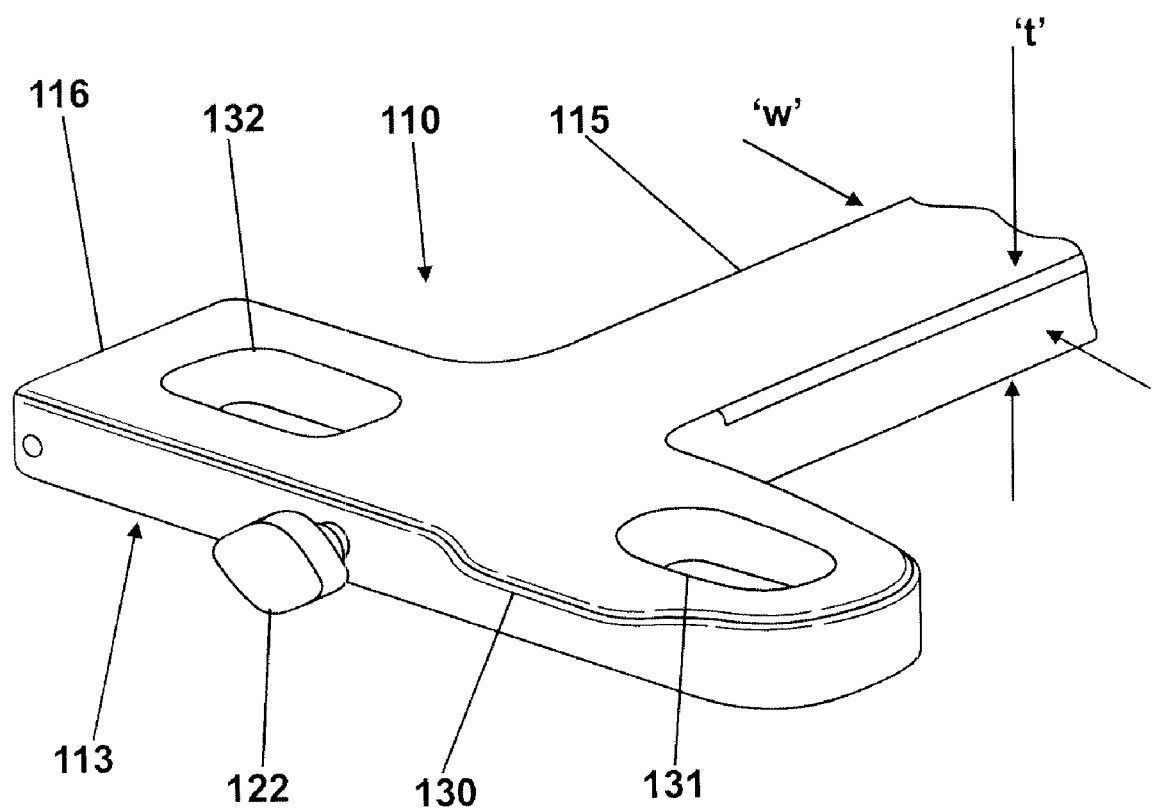
FIG. 13 is a pictorial view of the roof bar shown in FIGS. 10 to 12 when in the stowed state.
Figure 14A:
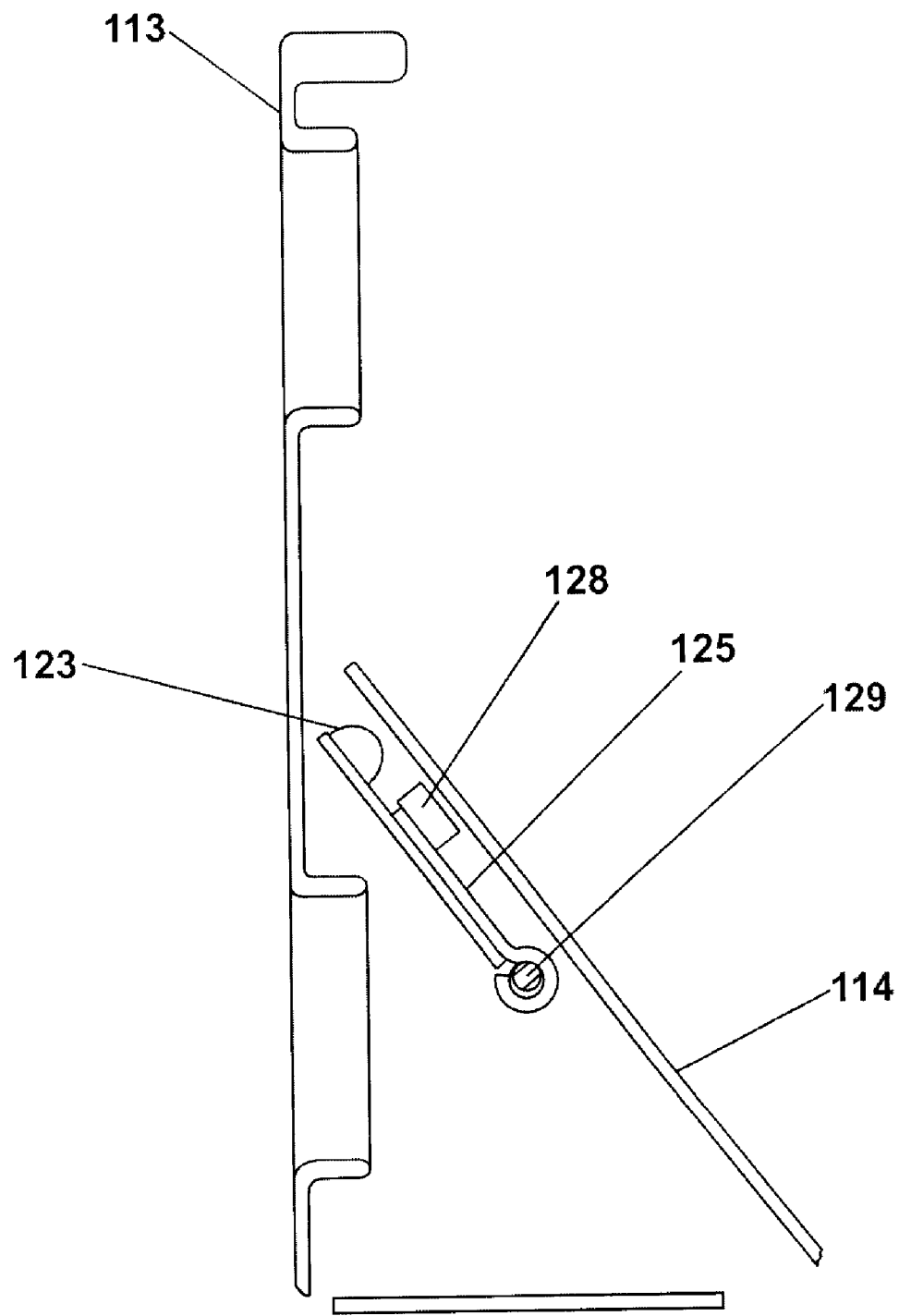
FIGS. 14a to 14c are partial cross-sections showing the relative positions of a control link when the roof bar is in the positions shown in FIGS. 10, 12 and 13.
Figure 14B:
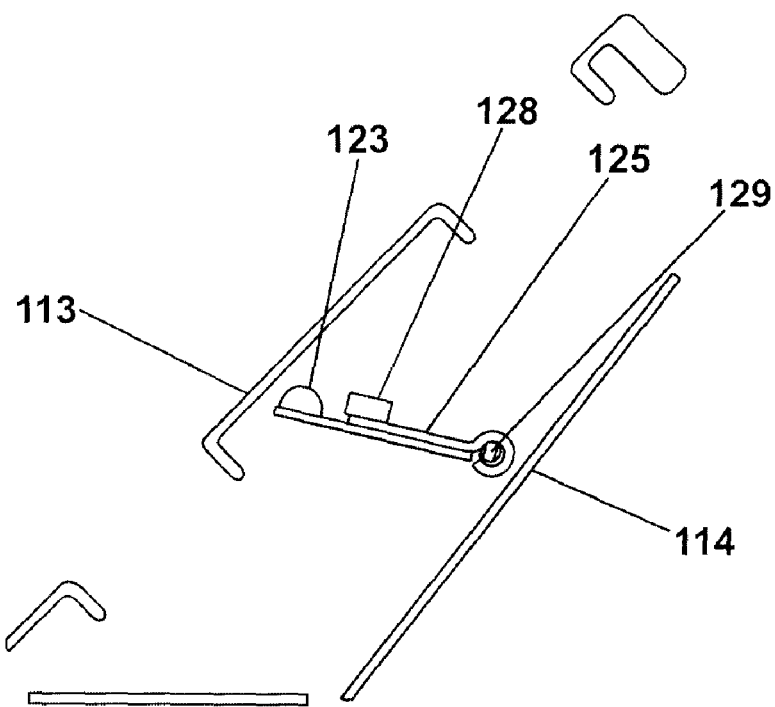
Figure 14C:
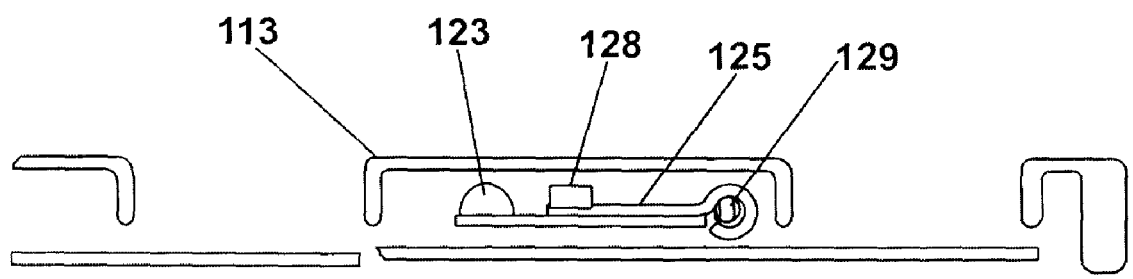

The width and thickness of the end portions 116 is such that they can be folded down so as to overlie the corresponding stay 114 and base plate 111 when the roof bar 110 is moved to the stowed position. That is to say, the end portions 116 define an internal volume in which the stays 114 are contained when the roof bar 110 is in the stowed state and, as shown in FIG. 13, the end portions 116 overlie the corresponding stay 114 and base plate 111 when the roof bar 110 is in the stowed state so as to totally obscure these parts 111, 114 from view. This considerably improves the aesthetic appeal of the stowed roof bar 110.

The height of the stowed roof bar 110 is therefore determined by the greatest of the thickness of the end portions 116 of the roof bar 110 and the thickness of the crossbar portion 115. Although the thickness of these parts 115, 116 will be determined to some extent by the application, in most cases it is possible to use a thickness of between 15 and 20 mm without sacrificing the mechanical integrity of the roof bar 110.

Base plates 111 may be secured in the drainage ditches 9 of the roof 5 and, when stowed, crossbar 115 may rest upon the lower surface 8b of one of the channels 8 if such channels 8 are provided. However, it will be appreciated that roof bar 110 could be fastened to roof 5 so that it lies entirely within one of channels 8 or if there are no channels 8 directly to any convenient location on the roof 5.

Each of the two stays 114 is latchable to a respective one of the two end portions 116 by a respective latch mechanism, best seen in FIGS. 11, 12 and 14a to 14c.

Each latch mechanism comprises of a control link in the form of a latch arm 125 fastened at one end to a transfer rod 123 that extends across the roof bar 110 so as to link together the two latch mechanisms. Each latch arm 125 is pivotally connected at an opposite end to the end where it is fastened to the transfer rod 123 to a corresponding stay 114 by means of a pivot pin 129. The transfer rod 123 is "D" shaped in the region of each end portion 116 so as to provide a flat surface to which each latch arm 125 can be fastened.

When the latch mechanism is released, the latch arm 125 forms, in combination with the respective end portion 116, the respective stay 114 and the respective base plate 111, a four bar linkage that controls the movement of the roof bar 110 as it transitions between its stowed and deployed states.

Latch arm 125 has a latch member 128 fastened to it for engagement with an aperture 117 formed in a side wall of the corresponding stay 114. A chamfered end portion, 126, of the latch member 128 forms a detent that is selectively engageable with the aperture 117 so as to latch the stay 114 to the end portion 116, thereby holding the roof bar 110 in the deployed state.

A spring, 124, is used to bias the chamfered end portion 126 into the aperture 117 so that the latch mechanism automatically latches whenever the stay 114 and the end portion 116 are moved to the deployed state. The latch arm 125 is transversely moveable within the corresponding stay 114 so as to allow the chamfered end portion 126 to be disengaged from the aperture 117 in the wall of a corresponding stay 114 to release the latch mechanism.

Each of the stays 114 has two hooked ends, 114u, which hook over transfer rod 123 to improve the mechanical integrity of the latch mechanism when the latch mechanism is engaged.

A user input device in the form of a knob, 122, is fastened to each end of transfer rod 123 so as to facilitate operation of the latch mechanism. This has the advantage that the roof bar 110 can be stowed or deployed from one end of roof bar 110, providing increased ease of use and eliminating the need for two operatives to deploy or stow the roof bar 110.

Because latch arms 125 at both ends of roof bar 110 are both connected to common transfer rod 123 and to one of the two stays 114, a longitudinal displacement of transfer rod 123 (that is to say, sliding the transfer rod 123 transversely with respect to the vehicle 1) by pushing the knob 122 on one side of the vehicle 1 or pulling the knob 122 on the other side of the vehicle will simultaneously release both latch mechanisms, thereby allowing roof bar 110 to be subsequently folded from the deployed to the stowed state.

In addition, during the transition between the deployed and stowed states, rotational movement of the transfer rod 123 by means of one of the knobs 122 can be used to assist with or facilitate folding of roof bar 110.

In operation, roof bar 110 can be moved from its deployed position, in which an upper surface of the crossbar 115 is positioned approximately 100 to 200 mm above the adjacent central roof portion 7, of the motor vehicle 1 to the stowed state, in which it is folded flat on the roof 5, by simply releasing the latch mechanisms using one of the knobs 122 and rotating one of knobs 122 while pushing or pulling on the elongate load carrying member 113 to move it to its stowed position. To reverse the procedure the elongate load carrying member 113 can be lifted from its stowed position using, if necessary, the grip handle 130 and rotating one of the knobs 122 until the latch mechanisms on both ends of the roof bar 110 re-engage.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A stowable roof bar (10, 110) for a motor vehicle (1) comprising:
an elongate load carrying member (13, 113) extending across the vehicle (1) and being pivotally connected to a roof (5) of the vehicle (1) for movement between stowed and deployed positions and a latch mechanism (20, 120) to selectively hold the elongate load carrying member (13, 113) in the deployed position in which a crossbar portion (15, 115) of the elongate load carrying member (13, 113) is spaced above the roof (5) of the vehicle (1), wherein the width (w) of the crossbar portion (15, 115) is greater than the thickness (t) of the crossbar portion (15, 115) and the crossbar portion (15, 115) is re-orientated by the movement of the elongate load carrying member (13, 113) from the stowed position to the deployed position so as to increase the vertical resistance to bending of the crossbar portion (15, 115), wherein the elongate load carrying member (13, 113) comprises the crossbar portion (15, 115) and two end portions (16, 116) one fastened to each end of the crossbar portion (15, 115) and there are two stays (14, 114) each of which is latchable to a respective one of the two end portions (16, 116) by a respective latch mechanism (20, 120), and wherein each end portion (116) is U-shaped in cross-section and defines an internal volume in which a respective stay (114) is stowed when the roof bar (110) is in the stowed state.

2. A roof bar as claimed in claim 1 wherein each of the stays (14, 114) is connected to the corresponding end portion (16, 116) by a control link (25, 125) used to control the motion of the elongate load carrying member (13, 113) and the stay (14, 114) when the roof bar (10, 110) is reversibly moved between its deployed and stowed positions.

3. A roof bar as claimed in claim 2 wherein each control link (125) has a detent (126) forming part of a corresponding latch mechanism (128) attached thereto and the control link (125) is transversely moveable so as to disengage the detent (126) from an aperture (117) in a wall of a corresponding stay (114) so as to release the latch mechanism (120).

4. A roof bar as claimed in claim 3 in which each control link (125) is fastened at one end to a rod (123) used to link the two latch mechanisms (120) and is pivotally connected at an opposite end to one of the two stays (114), wherein a longitudinal displacement of the rod (123) by a user of the vehicle (1) is operable to simultaneously release both latch mechanisms (120) and rotational movement of the rod (123) facilitates folding of the roof bar (110).

5. A roof bar as claimed in claim 2 in which the control link (25) has a respective U-shaped end portion at each end, each of the U-shaped end portions having a first arm pivotally engaged with a respective end portion (16) and a second arm pivotally connected to the respective stay (14) on the same end of the roof bar (10).

6. A roof bar as claimed in claim 2 wherein, when the latching means (20, 120) are released, each control link (25, 125) forms in combination with the respective end portion (16, 116), the respective stay (14, 114) and a respective base plate (11, 111) a four bar linkage.

7. A roof bar as claimed in claim 1 wherein the roof (5) of the motor vehicle (1) has a high point and a low point and, when the roof bar (10, 110) is moved to its stowed state, no part of the stowed roof bar (10, 110) is located higher than the high point of the roof (5) so that the overall height of the motor vehicle (1) is not increased by the stowed roof bar (10, 110) and no part of the roof bar (10, 110) is located lower than the low point on the roof (5).

8. A motor vehicle as claimed in claim 7 wherein the roof (5) of the motor vehicle (1) has a high point and, when the roof bars (10, 110) fitted to the roof (5) of the vehicle (1) are moved to their respective stowed states, no part of the stowed roof bars (10, 110) is located higher than the high point of the roof (5) so that the overall height of the motor vehicle (1) is not increased by the stowed roof bars (10, 110) and the roof (5) has a low point corresponding to a height below which a surface is not self draining and no part of each roof bar (10, 110) is stowed lower than the low point of the roof (5).

9. A motor vehicle as claimed in claim 8 wherein the roof has a convex central portion (7) bounded on each side by a longitudinally extending drainage ditch (9) and the low point of the roof (5) corresponds to the height of the drainage ditches (9) and the central portion (7) of the roof (5) has a number of open ended channels (8) formed in it to accommodate the stowed roof bars, each of the channels (8) having a base surface (8b) located no lower than the height of the drainage ditches (9) so as to ensure that it is self draining and each roof bar (10, 110) is stowed in a respective one of the channels (8).

10. A stowable roof bar as claimed in claim 1 wherein the crossbar portion (15, 115) is orientated such that the width (w) of the crossbar portion (15, 115) is vertically arranged when the elongate load carrying portion (13, 113) is in the deployed position and the thickness (t) of the crossbar portion (15, 115) is vertically arranged when the elongate load carrying portion (13, 113) is in the stowed position.

11. A roof bar as claimed in claim 1 wherein the two latch mechanisms (20, 120) are linked together so that they work in unison so as to facilitate the releasing of the two latch mechanisms (20, 120) from one end of the roof bar (10, 110).

12. A roof bar as claimed in claim 1 wherein the roof bar (10, 110) is arranged to fold such that the end portions (16, 116) of the elongate load carrying member (13, 113) fold over onto the stays (14, 114) without increasing the stacked height of the stowed roof bar (10, 110).

* * * * *